(12) United States Patent
West et al.

(10) Patent No.: US 7,723,893 B2
(45) Date of Patent: May 25, 2010

(54) BRUSH ASSEMBLY INCLUDING BIASING MEMBER FOR APPLYING FORCE

(75) Inventors: Joshua D. West, Towson, MD (US); Brandon L. Verbrugge, Towson, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 12/198,445

(22) Filed: Aug. 26, 2008

(65) Prior Publication Data

US 2008/0315712 A1 Dec. 25, 2008

Related U.S. Application Data

(63) Continuation of application No. 11/270,877, filed on Nov. 9, 2005, now Pat. No. 7,432,627.

(60) Provisional application No. 60/627,015, filed on Nov. 10, 2004.

(51) Int. Cl.
H02K 13/00 (2006.01)

(52) U.S. Cl. .................. 310/244; 310/239; 310/242

(58) Field of Classification Search ............... 310/239, 310/242–244, 246
See application file for complete search history.

(56) References Cited

U.S. PATENT DOCUMENTS

| 1,794,291 | A | | 2/1931 | Hobart |
| 2,325,915 | A | * | 8/1943 | Naul ........................... 310/428 |
| 2,345,428 | A | | 3/1944 | Rhoads |
| 2,389,941 | A | | 11/1945 | Stephenson |
| 2,413,560 | A | | 12/1946 | Groot |
| 2,498,346 | A | | 2/1950 | Smith, Sr. |
| 2,753,477 | A | * | 7/1956 | Yahn et al. ................... 310/239 |
| 2,755,399 | A | * | 7/1956 | Phillips ....................... 310/244 |
| 2,760,094 | A | * | 8/1956 | Edmundson ................ 310/239 |
| 3,450,916 | A | * | 6/1969 | Takaichi ...................... 310/244 |
| 3,648,086 | A | * | 3/1972 | Renner et al. ................. 310/63 |
| 3,851,197 | A | * | 11/1974 | Watanabe .................... 310/244 |
| 4,595,851 | A | | 6/1986 | Houben et al. |
| 4,638,203 | A | | 1/1987 | Maki et al. |
| 4,741,677 | A | | 5/1988 | Frigo |
| 4,746,829 | A | | 5/1988 | Strobl |
| 4,749,899 | A | | 6/1988 | Ishizawa et al. |
| 5,015,896 | A | | 5/1991 | Wong |
| 6,880,556 | B2 | | 1/2004 | Menz et al. |
| 7,242,127 | B2 | | 7/2007 | Okamoto |

FOREIGN PATENT DOCUMENTS

| DE | 312248 | 1/1919 |
| DE | 560 230 | 9/1932 |
| DE | 8525046 | 8/1986 |
| EP | 0501839 | 9/1992 |
| EP | 0767525 | 4/1997 |

* cited by examiner

Primary Examiner—Thanh Lam
(74) Attorney, Agent, or Firm—Harness, Dickey & Pierce, P.L.C.

(57) ABSTRACT

A brush assembly may include a support member, a conductive arm having a first end portion and a second end portion, where the first end portion is coupled to the support member, a brush coupled to the second end portion of the conductive arm, and a biasing member configured to apply a force to the conductive arm.

7 Claims, 4 Drawing Sheets

BRUSH ASSEMBLY INCLUDING BIASING MEMBER FOR APPLYING FORCE

CROSS-REFERENCE TO RELATED APPLICATIONS

This application is a continuation of U.S. Ser. No. 11/270,877, filed Nov. 9, 2005, which claims the benefit of U.S. Provisional Application No. 60/627,015, filed on Nov. 10, 2004 and titled "Brush Assembly Including Spring For Applying Force," which is incorporated hereby by reference.

TECHNICAL FIELD

This description relates to motors and, more particularly, to a brush assembly which includes a biasing member to apply the brush against a commutator.

BACKGROUND

Electric motors are used in various applications, as well as in a number of work related areas. One area where motors are utilized is in the power tool industry. In order to improve the power tool output, it is important to have a brush assembly which is capable of transmitting electricity to a commutator.

The effectiveness of the brush and the wear on the brush is decreased when the brush is subjected to arcing. Arcing may occur when the brush has a tendency to bounce or move away from the commutator such as when the brush hits irregularities or rough spots during operation.

SUMMARY

In one general aspect, a brush assembly may include a support member, a conductive arm having a first end portion and a second end portion, where the first end portion is coupled to the support member, a brush coupled to the second end portion of the conductive arm, and a biasing member configured to apply a force to the conductive arm.

Implementations may include one or more of the following features. For example, the biasing member may include a spring. The biasing member and the conductive arm may be separately coupled to the support member. The support member may include a post and the biasing member may be coupled to the post.

The support member may include a post and the first end portion of the conductive arm may coupled to the post. The first end portion of the conductive arm may be shaped to fit at least partially around the post. The post may include a protruding member to hold the first end portion of the conductive arm on the post. In one exemplary implementation, the first end portion of the conductive arm and the post are each substantially circular.

The support member may include a first post that couples with the biasing member and a second post that couples with the conductive arm, where the first post and the second post are different. The biasing member may be disposed at least partially under the conductive arm.

In one implementation, the brush may be welded to the second end portion of the conductive arm. In another exemplary implementation, the second end portion of the conductive arm may be crimped around the brush.

The brush assembly may include a conductive connector and a wire that connects the conductive arm to the conductive connector. The conductive arm and the biasing member each may apply a force to the brush. The conductive arm and/or the brush may include copper. The brush may be coupled to the second end portion of the conductive arm such that substantially all of the brush is usable. The conductive arm may include an angled surface for receiving the biasing member. The brush may be arcuate.

In another general aspect, an electric motor may include windings, a commutator, and a brush assembly. The brush assembly may include a support member, a conductive arm having a first end portion and a second end portion, where the first end portion is coupled to the support member, a brush coupled to the second end portion of the conductive arm, and a biasing member configured to apply a force to the conductive arm. Implementations may include one or more of the features described above.

In another general aspect, a power tool may include a housing, an electric motor coupled with the housing, and an output member coupled with the electric motor. The electric motor may include windings, a commutator, and a brush assembly. The brush assembly may include a support member, a conductive arm having a first end portion and a second end portion, where the first end portion is coupled to the support member, a brush coupled to the second end portion of the conductive arm, and a biasing member configured to apply a force to the conductive arm. Implementations may include one or more of the features described above.

Other features will be apparent from the description, the drawings, and the claims.

BRIEF DESCRIPTION OF THE DRAWINGS

Like reference numerals in the various drawings indicate like elements.

DETAILED DESCRIPTION

The following description is merely exemplary in nature and is in no way intended to limit the application or uses of the described features.

Figure 1:
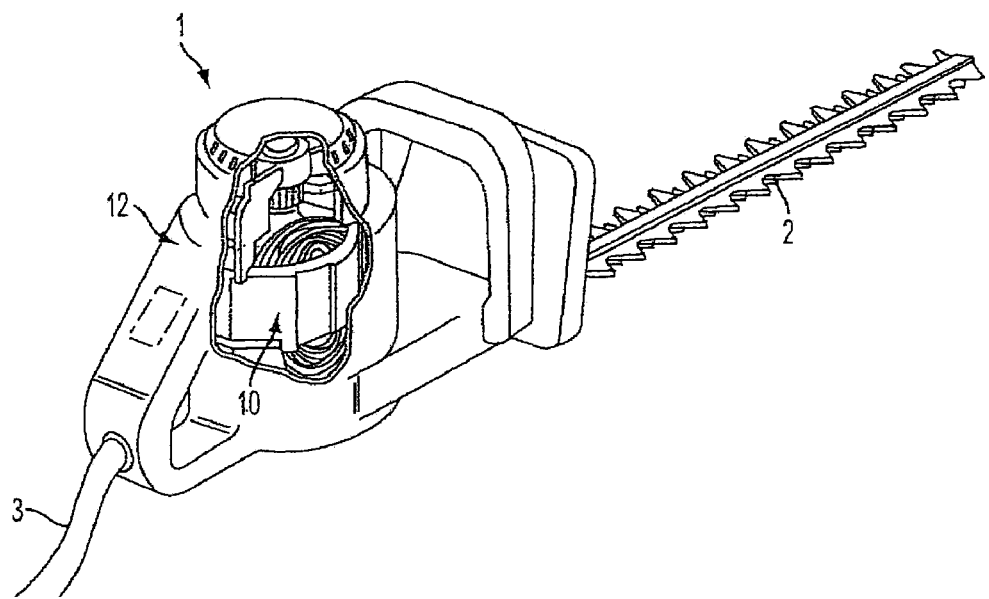
FIG. 1 is a perspective view of a power tool with a cut-away illustrating a motor including a brush assembly.

Referring to FIG. 1, a power tool 1 may include a motor 10 disposed in a power tool housing 12. Although the power tool 1 illustrated is a cutter, it is merely exemplary and not meant to limit the scope of this description. For example, power tool 1 may be other power tools such as, for example, a drill, a hammer, a hammerdrill, a nailer, a screwdriver, a wrench, a saw, a sander, a router, a planer, a grinder, or any other power tool. The power tool 1 also may include an output member 2, in this example, cutters. The power tool 1 also is coupled to a power supply 3 to provide power to the power tool 1. The power supply 3 may include a battery and/or a power cord that provides electrical power from an external source to the power tool 1.

Figure 2:
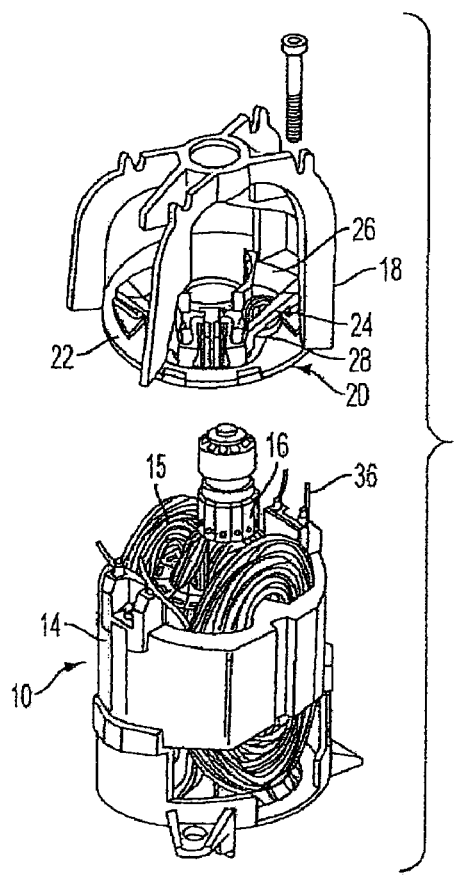
FIG. 2 is a perspective view of a motor with a brush assembly.

Referring also to FIG. 2, the motor 10 also may include a housing 14, windings 15, commutator 16 and a support structure 18 (e.g., a spider structure) to support the motor in the power tool housing 12. A brush assembly 20 is illustrated coupled with the support structure 18.

Figure 3:
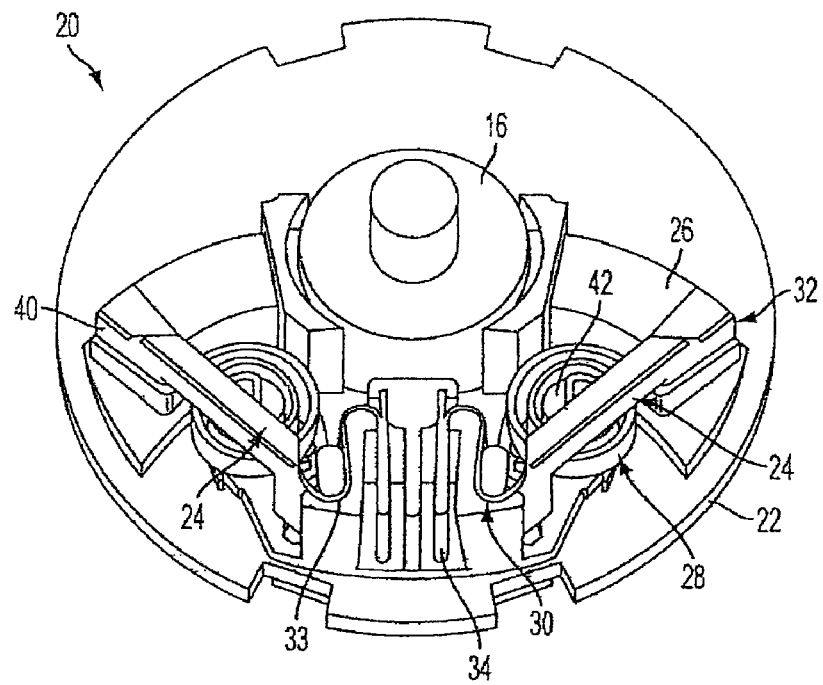
FIG. 3 is a perspective view of the brush assembly of FIG. 2.

Referring also to FIG. 3, the brush assembly 20 may include a non-conductive annular ring 22 with a conductive arm 24 and with a brush 26 secured to the conductive arm 24. In one exemplary implementation, the brush 26 is an arcuate brush. A biasing member 28 applies a force to the conductive arm 24. In one exemplary implementation, annular ring 22 functions as a support member for the conductive arm 24, brush 26 and the biasing member 28. The explanation of a singular brush set will be given and it will be understood that the description applies to each brush set that may be included in a brush assembly.

In one exemplary implementation, the conductive arm 24 may include a first end portion 30 and second end portion 32. The first end portion 30 of the conductive arm 24 may be coupled to the annular ring 22. The first end portion 30 of the conductive arm 24 may include a connector member 34 to electrically connect the conductive arm 24 with the electrical wires 36 of the motor 10. The first end portion 30 also may include a serpentine portion 33 that may be secured in a groove on the annular ring 22.

The second end portion 32 of the conductive arm 24 is electrically coupled with the brush 26. In one exemplary implementation, the second end portion 32 of the conductive arm 24 may be crimped around the brush 26 to be electrically coupled with the brush 26. By crimping the conductive arm 24 around the brush 26, substantially all of the brush 26 may be used as the brush wears down.

In another exemplary implementation, the brush 26 may be welded to the conductive arm 24 to secure the brush 26 to the conductive arm 24 and to form an electrical connection between the brush 26 and the conductive arm 24. For example, the brush 26 may be manufactured from a powdered metal material. The brush 26 may have an arcuate shape to enhance the force onto the commutator 16. The brush 26 may include a substantial amount of powdered conductive material, such as copper, at its end adjacent the conductive arm 24. This enables the brush 26 to be welded directly to the conductive arm 24, which is likewise manufactured from a copper material. Electrically connecting the brush 26 to the conductive arm 24 eliminates the need for a pigtail connector. By welding the brush 26 to the conductive arm 24, substantially all of the brush 26 may be used as the brush wears down. Welding the brush 26 to the conductive arm 24 eliminates the need for a brush box or fasteners that may be used to couple the brush to an arm and typically prevent substantially all of the brush from being used. By using welding, the entire brush 26 may be substantially used. Additionally, in this exemplary implementation, the elimination of pigtail connections prevents commutator 16 damage that may occur due to engagement of the commutator 16 with the pigtail wire.

In one exemplary implementation, the first end portion 30 of the conductive arm 24 may be electrically coupled with the wires 36 of the motor. This enables the brush 26 to be cantilevered with respect to the arm 24 and also connect with the electrical wiring (as seen in FIG. 3). The conductive arm 24 includes a surface 40 opposite of the brush 26 to enable the biasing member 28 to apply a force directly onto the conductive arm 24. The biasing member 28 along with the arcuate brush 28 may provide a constant force on the commutator 16. This enables the brush 26 to ride along the commutator 16 and substantially eliminate bounce on the commutator 16 which may cause arcing.

In one implementation, the biasing member 28 may be a spring that includes a coil which may secured to a post 42 on the annular ring 22 to secure the biasing member 28 in position. The biasing member 28 may be different types of springs or other structures that provide biasing characteristics similar to a spring including, for example, a torsion spring, a twin spring, and other constant force springs. The biasing member 28 applies a desired force so that sufficient force is present to maintain the brush 26 against the commutator 16. Also, having the spring end, as it applies the force, as close to the brush as possible enhances the application of force on the brush 26. The biasing member 28 may be configured to provide a substantially constant force to the brush 26 through the life of the brush to reduce the rate of brush wear.

Figure 4:
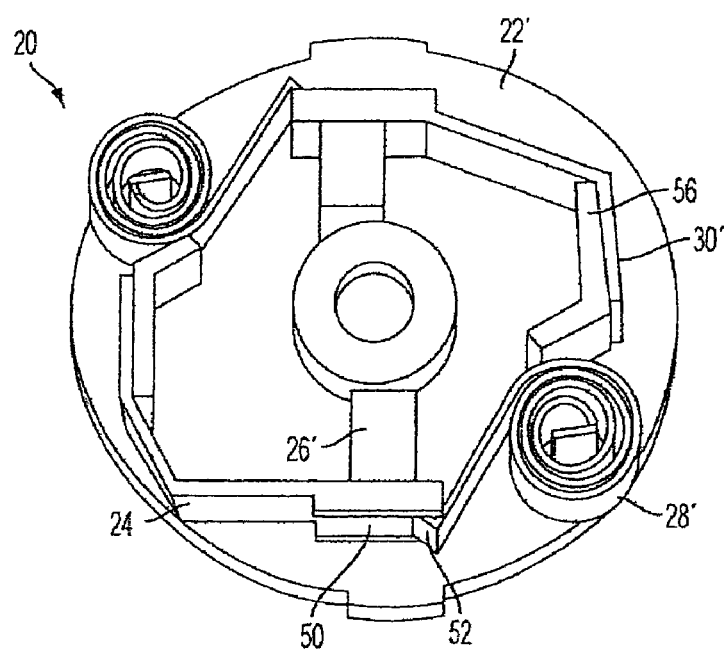
FIG. 4 is a perspective view of an exemplary implementation of a brush assembly.

Referring to FIG. 4, another exemplary implementation of the brush assembly 20' is illustrated. An angled surface 50 may be angled with respect to the conductive arm 24' so that the biasing member 28' can slide on the angled surface 50. The angled surface 50 enables the biasing member 28' to apply a substantially constant force, through the brush 26', onto the commutator. The biasing member 28' has an end 52 which rides along the angled surface 50. This constant contact provides the force which, due to the angle of the surface 50, provides a substantially constant force on the brush 26' during wear of the brush 26'. The constant force eliminates bouncing of the brush 26' and, therefore, increases the brush wear and prohibits damage to the commutator.

The conductive arm 24' may include an end portion 30' that is secured to a member 56 on the annular ring 22'. The end portion 30' may be electrically coupled with the wires (not shown) as explained above. The conductive arm 24' may be cantilevered as described above. The brush 26' may have a substantially rectangular cylinder design with substantially straight planar longitudinal sides.

Figure 5:
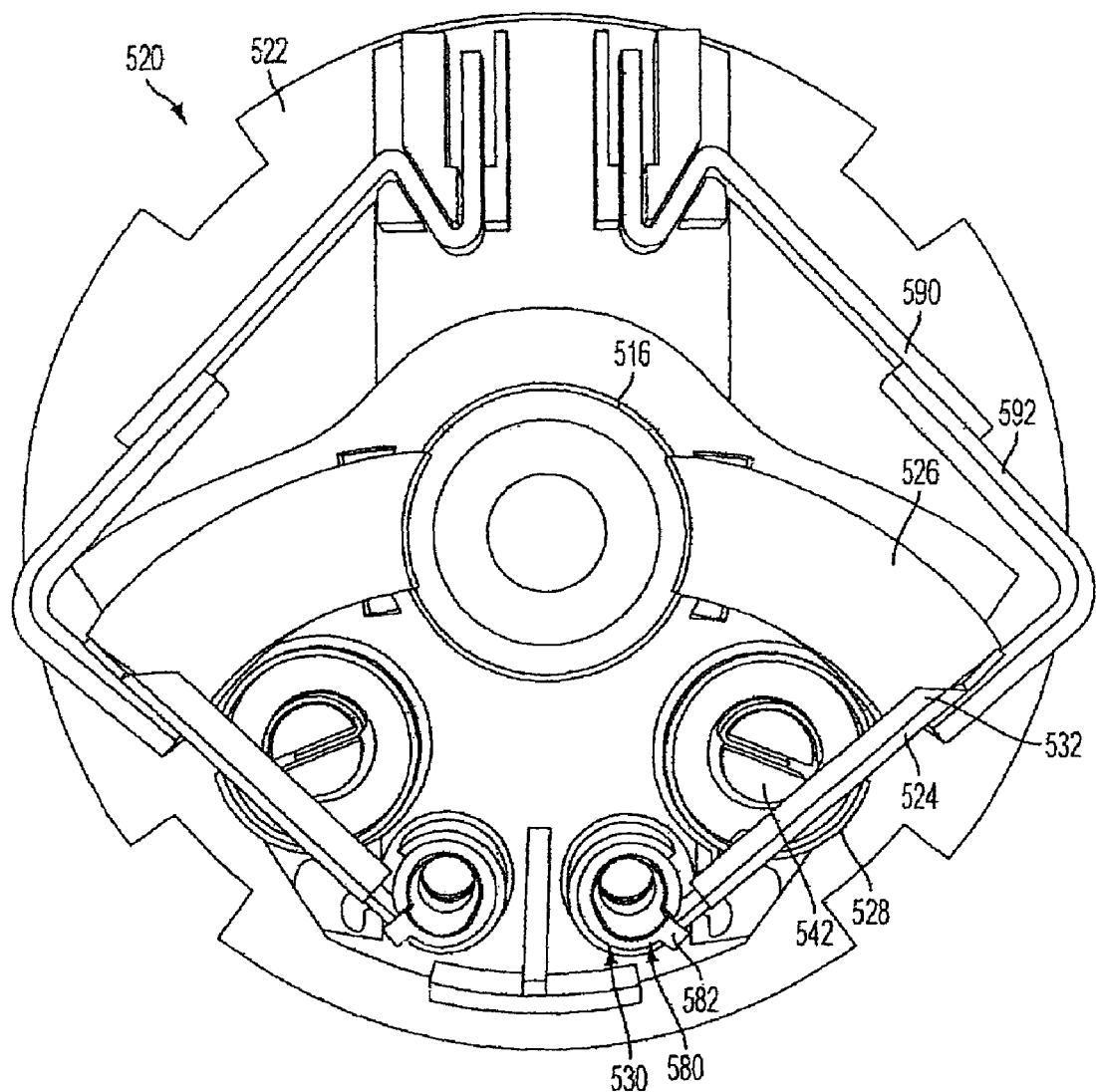
FIGS. 5 and 6 are perspective views of another exemplary implementation of a brush assembly.
Figure 6:
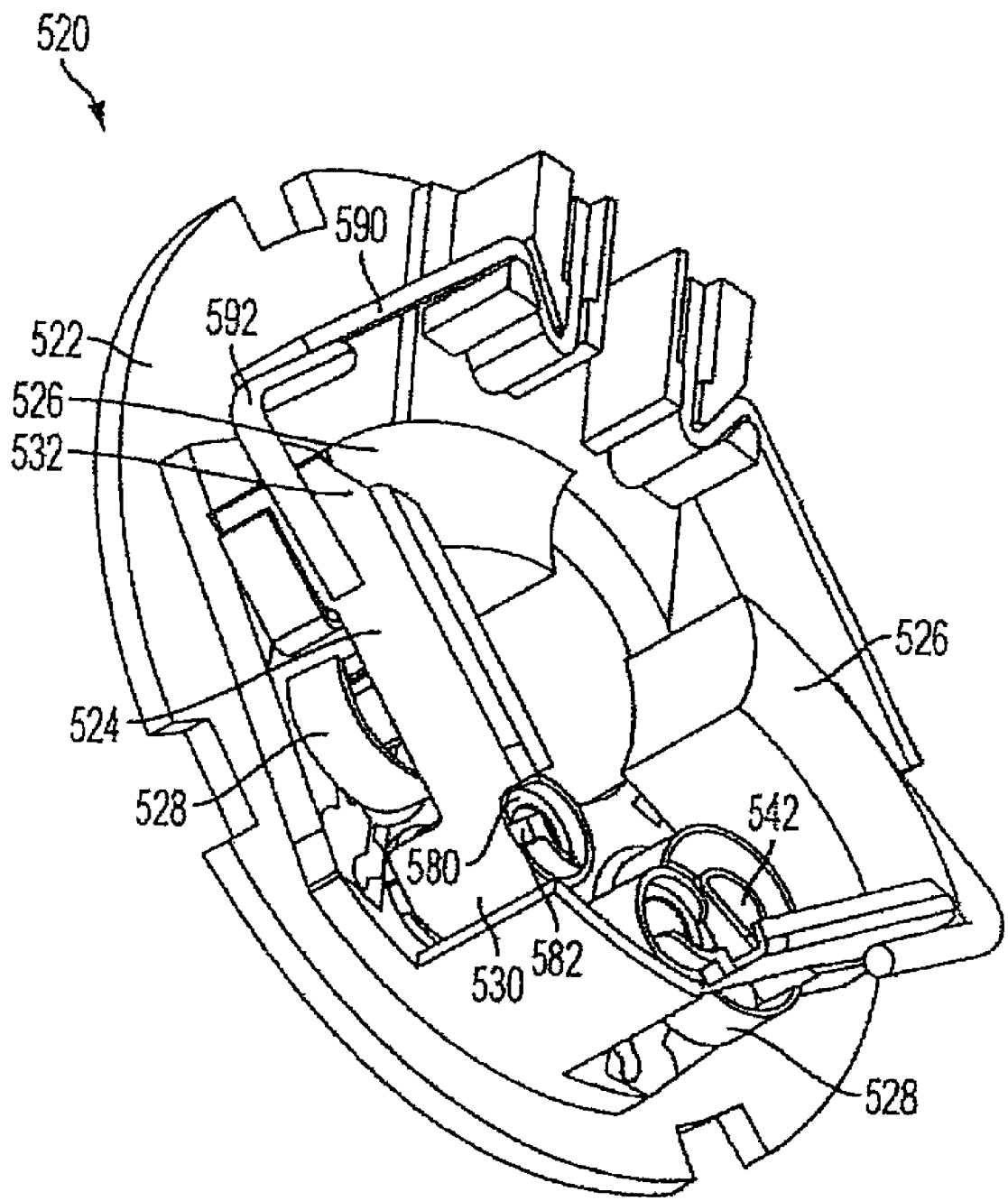

Referring to FIGS. 5 and 6, another exemplary implementation of brush assembly 520 is illustrated. Brush assembly 520 may include a non-conductive annular ring 522 that acts as a support member for conductive arm 524 and biasing member 528. Annular ring 522 may include a first post member 580 and a second post member 542. The conductive arm 524 may include a first end portion 530 that is coupled to the first post member 580. In one implementation, the first end portion 530 may be shaped to fit at least partially around the first post member 580. For instance, the first end portion 530 may be substantially circular to fit around a substantially circular first post member 580. The first post member 580 may include a protruding member 582 to prevent the first end portion 530 from sliding off of the first post member 580.

The conductive arm 524 may include a second end portion 532 that is coupled to a brush 526. The second end portion 532 may be coupled to the brush 526 as described above such that there is an electrical connection between the second end portion 532 and the brush 526.

Biasing member 528 may be coupled to the second post member 542. In one exemplary implementation, the biasing member 528 is a spring. At least a portion of the biasing member may be located below the conductive arm 524. The biasing member 528 is coupled to the conductive arm 524 to provide a substantially constant force to bias the brush 526 towards the commutator 516. In one implementation, both the biasing member 528 and the conductive arm 524 each provide a force to bias the brush 526 towards the commutator.

The brush assembly 520 also may include a conductive connector 590 and a wire 592 (e.g., a braided shunt wire) that electrically couples the conductive arm 524 and the conductive connector 590. The conductive connector 590 may be coupled to an electrical connection to the motor such as, for example, by connecting to one or more wires that are coupled to the motor.

It will become apparent to those skilled in the art that various modifications and variations may be made in the exemplary implementations of the brush assembly without departing from the scope and spirit of this description. Thus, it is intended that this description cover these modifications and variations provided they come within the scope of the appended claims and their equivalents.

What is claimed is:

1. A brush assembly comprising:
   a support member;
   a conductive arm having a first end portion and a second end portion, wherein the first end portion is coupled to the support member;
   a brush defining an axis coupled to the second end portion of the conductive arm;
   a surface on said brush or the second end portion of the conductive arm, said surface being substantially transverse to the brush axis; and
   a biasing member configured to apply a force directly on said surface of said brush or second end of said conductive arm such that said force from said biasing member is applied onto said surface in a direction along said brush axis.

2. The brush assembly of claim 1 where in the biasing member is disposed at least partially under the conductive arm.

3. The brush assembly of claim 1 wherein the brush is welded to the second end portion of the conductive arm.

4. The brush assembly of claim 1 wherein the conductive arm and the biasing member each apply a force to the brush.

5. The brush assembly of claim 1 wherein the brush is coupled to the second end portion of the conductive arm such that substantially all of the brush is usable.

6. An electric motor comprising:
   windings;
   a commutator; and
   a brush assembly, wherein the brush assembly comprises:
   a support member;
   a conductive arm having a first end portion and a second end portion, wherein the first end portion is coupled to the support member;
   a brush coupled to the second end portion of the conductive arm,
   a surface on said brush or the second end portion of the conductive arm, said surface being substantially transverse to the brush axis; and
   a biasing member configured to apply a force directly on said surface of said brush or second end of said conductive arm such that said force from said biasing member is applied onto said surface in a direction along said brush axis;
   a biasing member configured to apply a force directly on said brush or said conductive arm such that said force is applied in a direction along said brush axis by said biasing member.

7. A power tool comprising:
   a housing;
   an electric motor coupled with the housing; and
   an output member coupled with the electric motor, wherein the electric motor includes:
   windings;
   a commutator, and
   a brush assembly, wherein the brush assembly comprises:
   a support member;
   a conductive arm having a first end portion and a second end portion, wherein the first end portion is coupled to the support member;
   a brush coupled to the second end portion of the conductive arm, and
   a surface on said brush or the second end portion of the conductive arm, said surface being substantially transverse to the brush axis; and
   a biasing member configured to apply a force directly on said surface of said brush or second end of said conductive arm such that said force from said biasing member is applied onto said surface in a direction along said brush axis by said biasing member.

* * * * *

UNITED STATES PATENT AND TRADEMARK OFFICE
CERTIFICATE OF CORRECTION

PATENT NO. : 7,723,893 B2  Page 1 of 1
APPLICATION NO. : 12/198445
DATED : May 25, 2010
INVENTOR(S) : Joshua D. West et al.

It is certified that error appears in the above-identified patent and that said Letters Patent is hereby corrected as shown below:

Title Page,
Item [56] References Cited, FOREIGN PATENT DOCUMENTS, "DE 312248", "1/1919" should be -- 4/1919 --.

Column 5,
Line 19, "where in" should be -- wherein --.

Column 6,
Line 36, delete "by said biasing member".

Signed and Sealed this

Thirteenth Day of July, 2010

David J. Kappos
*Director of the United States Patent and Trademark Office*